(12) United States Patent
Bunker et al.

(10) Patent No.: US 6,695,582 B2
(45) Date of Patent: Feb. 24, 2004

(54) TURBINE BLADE WALL COOLING APPARATUS AND METHOD OF FABRICATION

(75) Inventors: Ronald Scott Bunker, Niskayuna, NY (US); Frederic Joseph Klug, Schenectady, NY (US); Shyh-Chin Huang, Latham, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 10/162,739

(22) Filed: Jun. 6, 2002

(65) Prior Publication Data
US 2003/0228221 A1 Dec. 11, 2003

(51) Int. Cl.[7] .................................. F01D 5/18
(52) U.S. Cl. .................. 416/96 R; 416/232; 416/236 R
(58) Field of Search .......................... 415/115; 416/95, 416/97 R, 232, 233, 236 R, 96 R (56) References Cited

U.S. PATENT DOCUMENTS

| | | | | |
|---|---|---|---|---|
| 5,328,331 A | * | 7/1994 | Bunker et al. | 416/96 R |
| 5,660,525 A | | 8/1997 | Lee et al. | 416/97 R |
| 6,000,908 A | | 12/1999 | Bunker | 416/95 |
| 6,179,556 B1 | | 1/2001 | Bunker | 415/115 |
| 6,234,755 B1 | | 5/2001 | Bunker et al. | 416/97 R |

FOREIGN PATENT DOCUMENTS

| | | |
|---|---|---|
| SU | 2101513 | 6/1995 |
| SU | 1533403 A1 | 11/1996 |
| SU | 2122123 C1 | 11/1998 |

OTHER PUBLICATIONS

"Turbine Blade Core Cooling Apparatus and Method of Fabrication," RS Bunker et al., Application # 10/162,755.

"Turbine Blade Cover Cooling Apparatus and Method of Fabrication," RS Bunker et al., Application # 10/162,756.

* cited by examiner

Primary Examiner—Edward K. Look
Assistant Examiner—Dwayne J. White
(74) Attorney, Agent, or Firm—Paul J. DiConza; Patrick K. Patnode (57) ABSTRACT

A turbine blade comprises an external pressure side plate comprising a plurality of external pressure ribs, an internal pressure side plate comprising a plurality of internal pressure ribs, and a plurality of pressure flow redirection areas. The external pressure side plate is disposed over the internal pressure side plate to form a pressure side double wall. The external pressure ribs are disposed at a first angle with respect to a blade span reference line and the internal pressure ribs are disposed at a second angle with respect to the blade span reference line to form the pressure flow redirection areas. The pressure side double wall is configured to pass a coolant through the pressure side double wall. A fabrication method aligns the external pressure side plate and the internal pressure side plate to form the pressure flow redirection areas between the external pressure side plate and the internal pressure side plate.

71 Claims, 7 Drawing Sheets

TURBINE BLADE WALL COOLING APPARATUS AND METHOD OF FABRICATION

BACKGROUND

The present invention relates generally to both gas turbines and steam turbines, and more particularly to internal core cooling arrangements in turbine blades. Turbine blades are typically cooled to decrease both the bulk temperature and maximum temperature of the turbine blade material to support higher mechanical loads in the turbine blade that incorporates an improved aerodynamic performance configuration.

Steam turbines include, but are not limited, to steam turbine power generation equipment and shipboard steam turbine propulsion equipment. Gas turbines include, but are not limited to, gas turbine power generation equipment and gas turbine aircraft engines. An exemplary steam turbine typically contains a high-pressure turbine section, a low-pressure turbine section, or a combination of both, which is rotated by the steam flow. An exemplary gas turbine typically includes a core engine, having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low-pressure turbine (located aft of the high pressure turbine) connected by a smaller diameter coaxial shaft to drive the front fan (located forward of the high pressure compressor) and to drive an optional low-pressure compressor (located between the front fan and the high pressure compressor). The low-pressure compressor sometimes is called a booster compressor or simply a booster.

In the exemplary gas turbine, typically the fan and the high and low pressure compressors and turbines have gas turbine blades each including an airfoil portion attached to a shank portion. In the exemplary steam turbine, typically the high and low pressure turbine sections have steam turbine blades each including an airfoil portion attached to a shank portion. Rotor blades are gas or steam turbine blades attached to a rotating gas or steam turbine rotor discs, respectively. Stator vanes are gas turbine blades or steam turbine blades attached to a non-rotating gas or steam turbine stator casings, respectively. Typically, there are alternating circumferential rows of radially-outwardly extending rotor blades and radially-inwardly extending stator vanes. When present in the gas turbine configuration, at least one first and one last row of stator vanes (also called inlet and outlet guide vanes) typically have their radially-inward ends also attached to a non-rotating gas turbine stator casing. Counter rotating "stator" vanes are also known in gas turbine designs. Conventional gas and steam turbine blade designs typically have airfoil portions that are made entirely of metal, such as titanium, or are made entirely of a composite. The all-metal blades, including costly wide-chord hollow blades, are heavier in weight, resulting in lower fuel performance and requiring sturdier blade attachments.

In a gas turbine aircraft application, the gas turbine blades that operate in the hot gas path are exposed to some of the highest temperatures in the gas turbine. Various design schemes have been pursed to increase the longevity of the blades in the hot gas path. By way of example and not limitation, these design schemes include blade coatings, and internal cooling of the blades.

In one common internal core cooling arrangement, a series of radial cooling holes extend through the entire turbine blade. The turbine blade is first manufactured as a solid blade. The solid blade is then drilled using Electro-Chemical Machining (ECM) or Shaped-Tube Electro-Chemical Machining (STEM), to create a plurality of through holes from about a blade root to about a blade tip. The radial cooling holes in axially long blades can be difficult to machine, sometimes requiring drilling from both ends of the blade. The blade with the radial cooling holes tends to have more mass than is desired. The extra mass can be problematic during thermal transients as the interior surfaces and the exterior surfaces of the blade do not respond at the same rate to the thermal transient, which results in thermal stresses. Moreover, the use of radial cooling holes is generally not possible in the leading and trailing edges of the blades, due to the three dimensional curvature of the blade. Alternatively, the need to locate the radial cooling holes forces a compromise of the aerodynamics to accommodate straight holes. One design alternative to the radial cooling holes is to bleed cooling flow to form a film-cooling layer over the blade.

The coolant for the internal cooling of the blades typically comes from a cooler temperature part of the gas turbine or from a separate source of cooling. The coolant is typically either an air-based coolant or a steam-based coolant. The air-based coolant is typically bled either from the compressor section or from a post-compressor region that surrounds the combustion section that is operating at a cooler temperature than the turbine blades and blade covers of concern. The air-based coolant is alternately supplied from a separate off-machine located air supply system. The steam-based coolant is typically supplied from a turbine section that is operating at a cooler temperature than the turbine blades of concern or the steam-based coolant can be supplied from an independent steam supply (i.e. other steam system or auxiliary boiler). However, providing the air-based coolant to internally cool the turbine blades represents internal work to the gas turbine that reduces the net output power of the gas turbine. Additionally, the issues related to directing the flow of the air-based coolant to the areas of highest heat load in the turbine blade has created the desire to improve the internal cooling of the blades even further.

Accordingly, there is a need for an improved turbine blade. What is needed is a turbine blade wall cooling apparatus that allows more aggressively shaped aerodynamic blade configurations, promotes lighter blade internal construction, maintains the structural support of the turbine blade, delivers higher cooling effectiveness, and lowers sensitivity to wall thickness variations by placing cooling air very near the external surfaces of the turbine blade. What is also needed is a turbine blade-cooling scheme that satisfies the turbine blade cooling requirements with less impact on a turbine efficiency.

SUMMARY

The present invention provides a turbine blade comprising an external pressure side plate comprising a plurality of external pressure ribs, an internal pressure side plate comprising a plurality of internal pressure ribs, and a plurality of pressure flow redirection areas. The external pressure side plate is disposed over the internal pressure side plate to form a pressure side double wall. The external pressure ribs are disposed at a first angle with respect to a blade span reference line and the internal pressure ribs are disposed at a second angle with respect to the blade span reference line to form the pressure flow redirection areas. The pressure side double wall is configured to pass a coolant through the pressure side double wall. A fabrication method aligns the external pressure side plate and the internal pressure side plate to form the pressure flow redirection areas between the external pressure side plate and the internal pressure side plate.

The present invention additionally provides another turbine blade comprising an external suction side plate comprising a plurality of external suction ribs, an internal suction side plate comprising a plurality of internal suction ribs, and a plurality of suction flow redirection areas. The external suction side plate is disposed over the internal suction side plate to form a suction side double wall. The external suction ribs are disposed at the first angle with respect to the blade span reference line and the internal suction ribs are disposed at the second angle with respect to the blade span reference line to form the suction flow redirection areas. The suction side double wall is configured to pass the coolant through the suction side double wall. A fabrication method aligns the external suction side plate and the internal suction side plate to form the suction flow redirection areas between the external suction side plate and the internal suction side plate.

DRAWINGS

These and other features, aspects, and advantages of the present invention will become better understood when the following detailed description is read with reference to the accompanying drawings in which like characters represent like parts throughout the drawings, wherein.

DESCRIPTION

Figure 1:
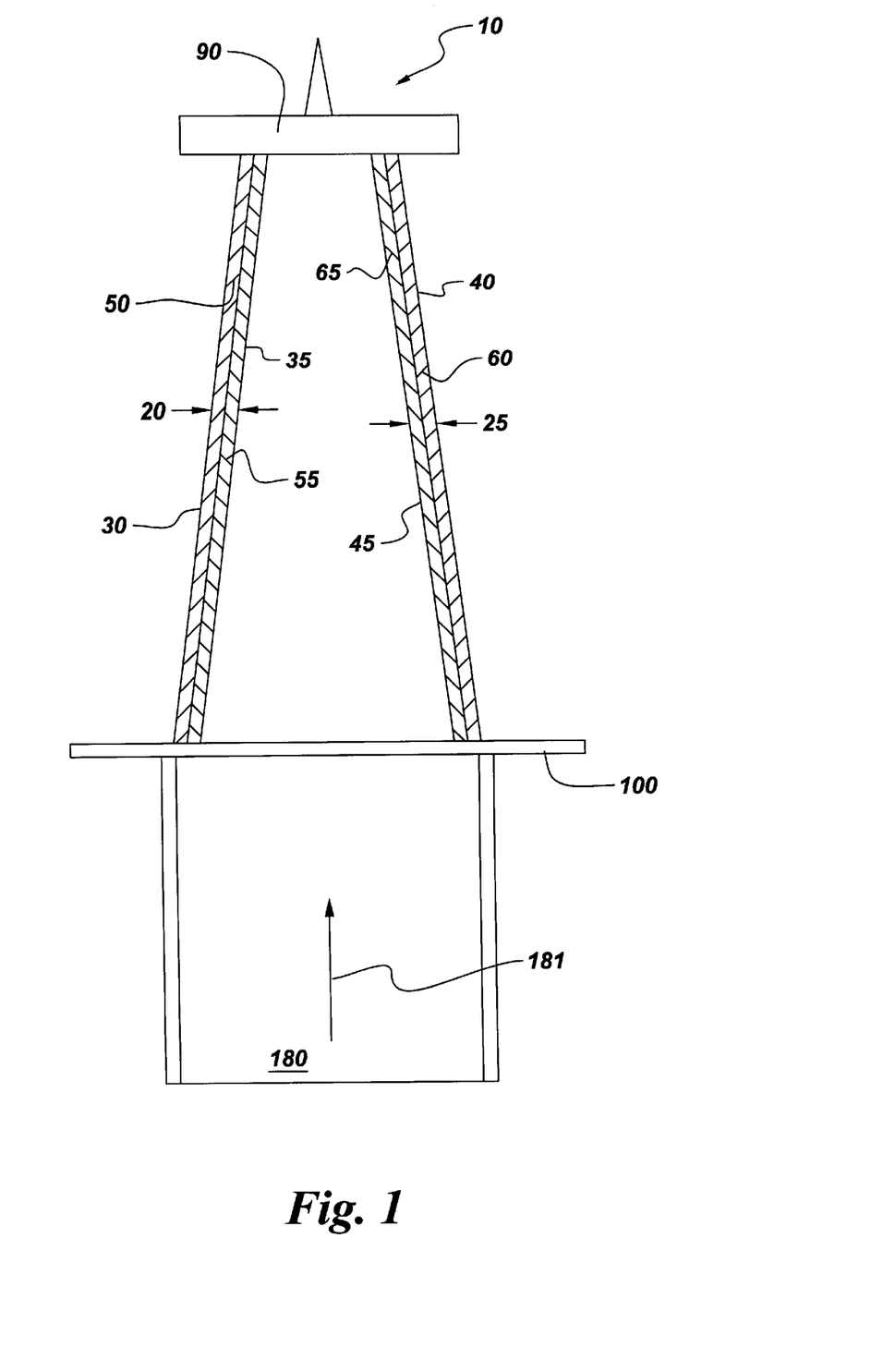
FIG. 1 is a cross sectional view of the turbine blade comprising the pressure side double wall and the suction side double wall in accordance with one embodiment of the present invention.
Figure 2:
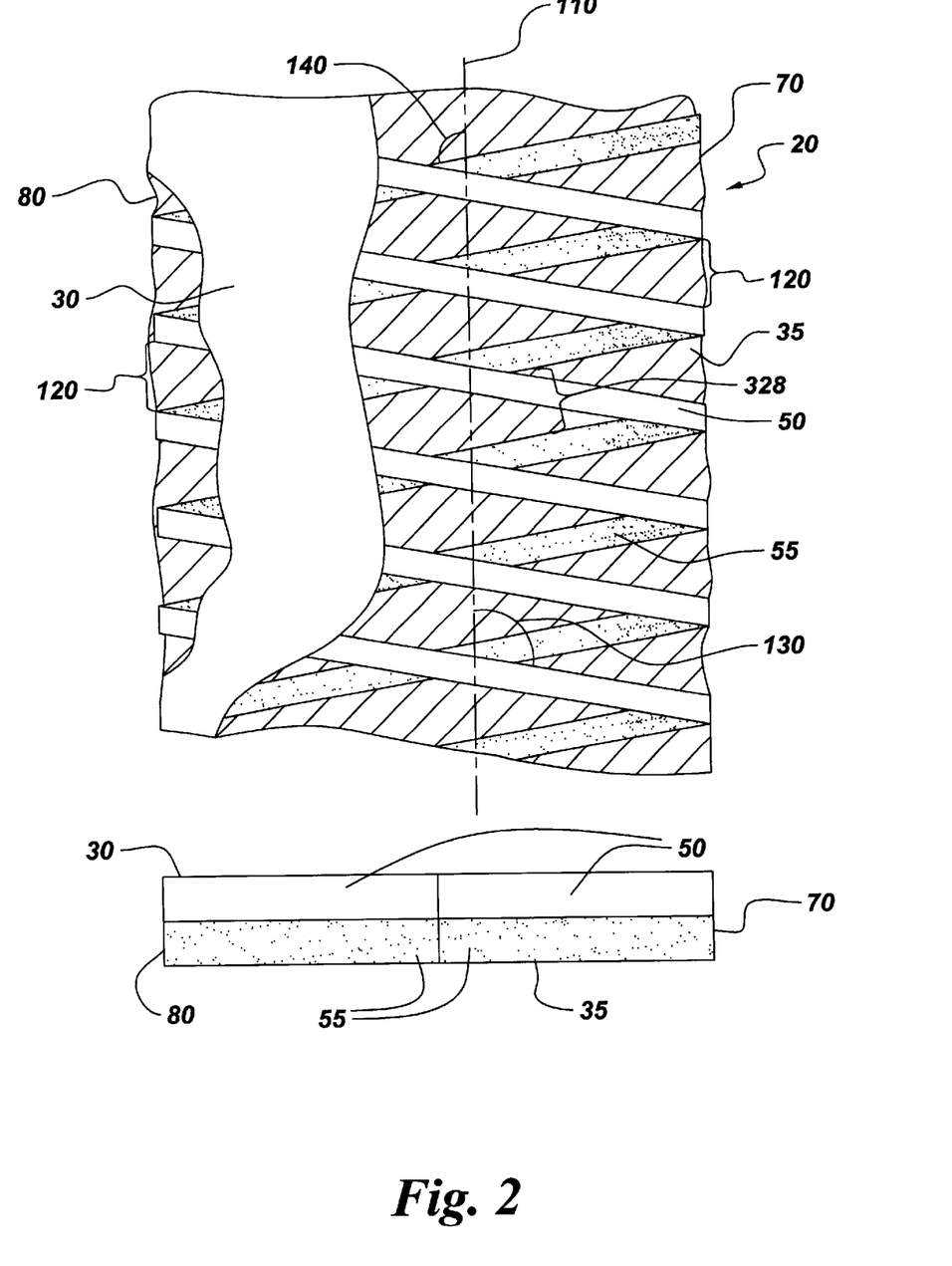
FIG. 2 is a cross sectional view of the pressure side double wall in accordance with one embodiment of the present invention.

FIGS. 1 and 2 provide, in one embodiment of the present invention, a pressure side double wall 20 for a turbine blade 10. The apparatus comprises an external pressure side plate 30 of FIG. 1 comprising a plurality of external pressure ribs 50, an internal pressure side plate 35 comprising a plurality of internal pressure ribs 55 and a plurality of pressure flow redirection areas 120 of FIG. 2. The external pressure side plate 30 is disposed over the internal pressure side plate 35 to form the pressure side double wall 20. The external pressure ribs 50 are disposed at a first angle 130 with respect to a blade span reference line 110 and the internal pressure ribs 55 are disposed at a second angle 140 with respect to the blade span reference line 110 to form the pressure flow redirection areas 120. The pressure side double wall 20 is configured to pass a coolant 180 of FIG. 1 through the pressure side double wall 20.

In the present invention, the term "turbine blade" is defined to include both the stationary airfoils (vanes and nozzles) and the rotating airfoils (blades and buckets).

In one embodiment of the present invention, the first angle 130 of FIG. 2 has a range from about 25 degrees to about 55 degrees, and the second angle 140 has a range from about −25 to about −55 degrees. In a more specific embodiment of the present invention the first angle 130 has a range from about 40 degrees to about 45 degrees, and second angle 140 has a range from about −40 to about −45 degrees. In another embodiment of the present invention, the first angle 130 has a range from about −25 degrees to about −55 degrees, and the second angle 140 has a range from about 25 to about 55 degrees. In a more specific embodiment of the present invention, the first angle 130 has a range from about −40 degrees to about −45 degrees, and second angle 140 has a range from about 40 to about 45 degrees.

In one embodiment of the present invention, the external pressure ribs 50 and the internal pressure ribs 55 are spaced apart in a rib spacing 328. The final rib spacing is determined by the artisan, where the artisan typically considers at least one of following artisan controlled variables: 1) the width of the pressure side double wall 20; 2) the allowable pressure drop of the coolant 180 through the pressure side double wall 20; and the heat load to be removed by the coolant 180 flowing through the pressure side double wall 20.

In one embodiment of the present invention, the pressure side double wall 20 further comprises a leading pressure edge cover 80 and a trailing pressure edge cover 70. In one embodiment of the present invention, the leading pressure edge cover 80 is disposed to the external pressure side plate 30 and the internal pressure side plate 35. In one embodiment of the present invention, the trailing pressure edge cover 70 is disposed to the external pressure side plate 30 and the internal pressure side plate 35. In one embodiment of the present invention, the external pressure side plate 30, the internal pressure side plate 35, the leading pressure edge cover 80, and the trailing pressure edge cover 70 are disposed in an investment casting.

In one embodiment of the present invention, the turbine blade cooling requirements determine the extent that the turbine blade 10 is fabricated with at least one of the pressure side double wall 20 and the suction side double wall 25.

Additionally, the present invention does not make any limitation as to how to pass the coolant 180 of FIG. 1 into or out of the pressure side double wall 20 and a suction side double wall 25. In one embodiment of the present invention, the pressure side double wall 20 and the suction side double wall 25 are disposed between a blade cover 90 and a blade root 100. In one embodiment of the present invention, the pressure side double wall 20 is configured to pass a portion of the coolant 180 that enters the blade root 100 to the blade cover 90 and the suction side double wall 25 is configured to pass another portion of the coolant 180 that enters the blade root 100 to the blade cover 90.

In another embodiment of the present invention, the coolant 180 is directed to at least one of the internal pressure side plate 35 and the internal suction side plate 45 through impingement holes (not shown in FIG. 1) drilled in the internal pressure side plate 35 of FIG. 1 and the internal suction side plate 45. The use of impingement holes and other alternative means of directing the coolant 180 through the internal pressure side plate 35 and the internal suction side plate 45 are well known to one skilled in the art.

Figure 3:
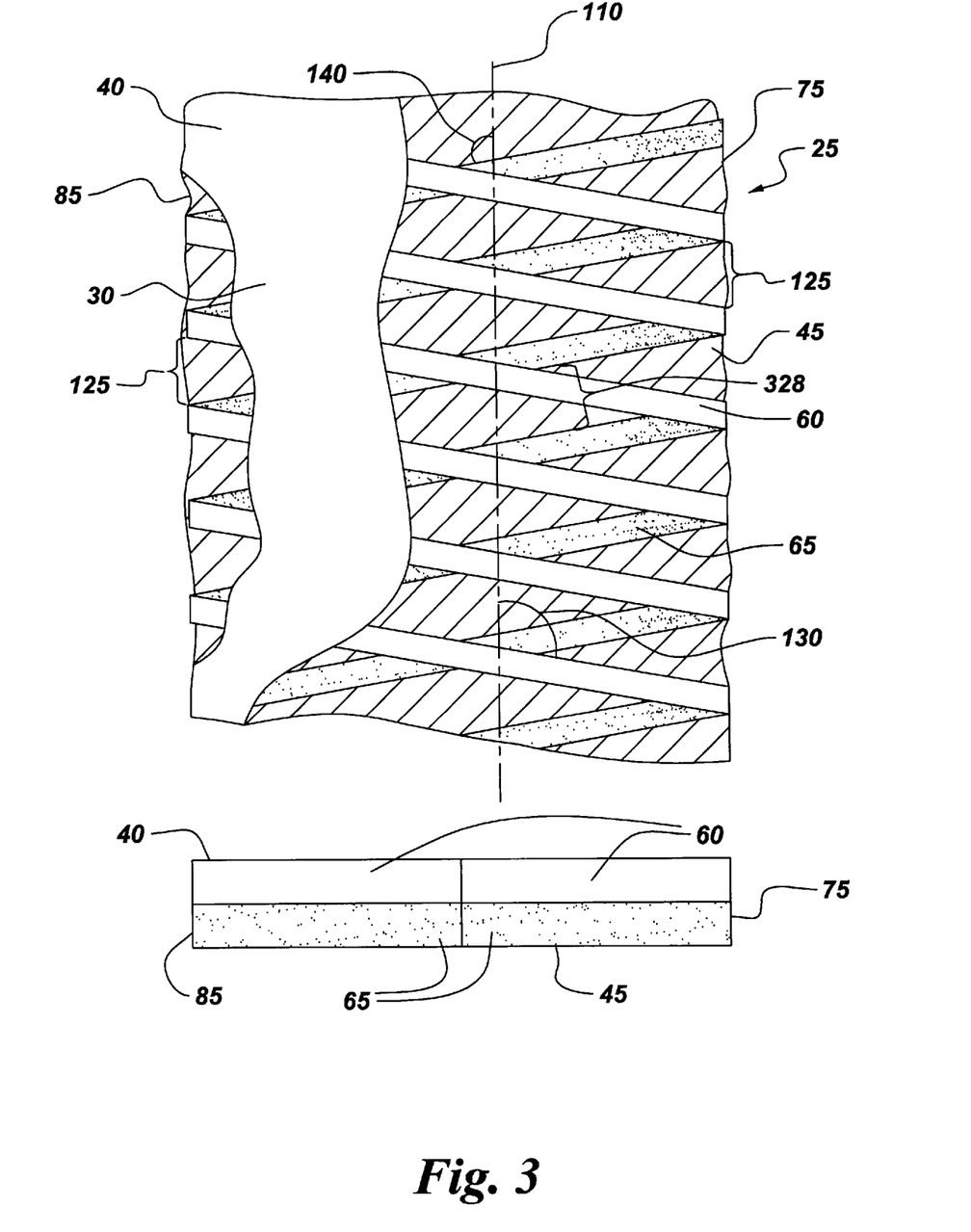
FIG. 3 is a cross sectional view of the suction side double wall in accordance with one embodiment of the present invention.
Figure 4:
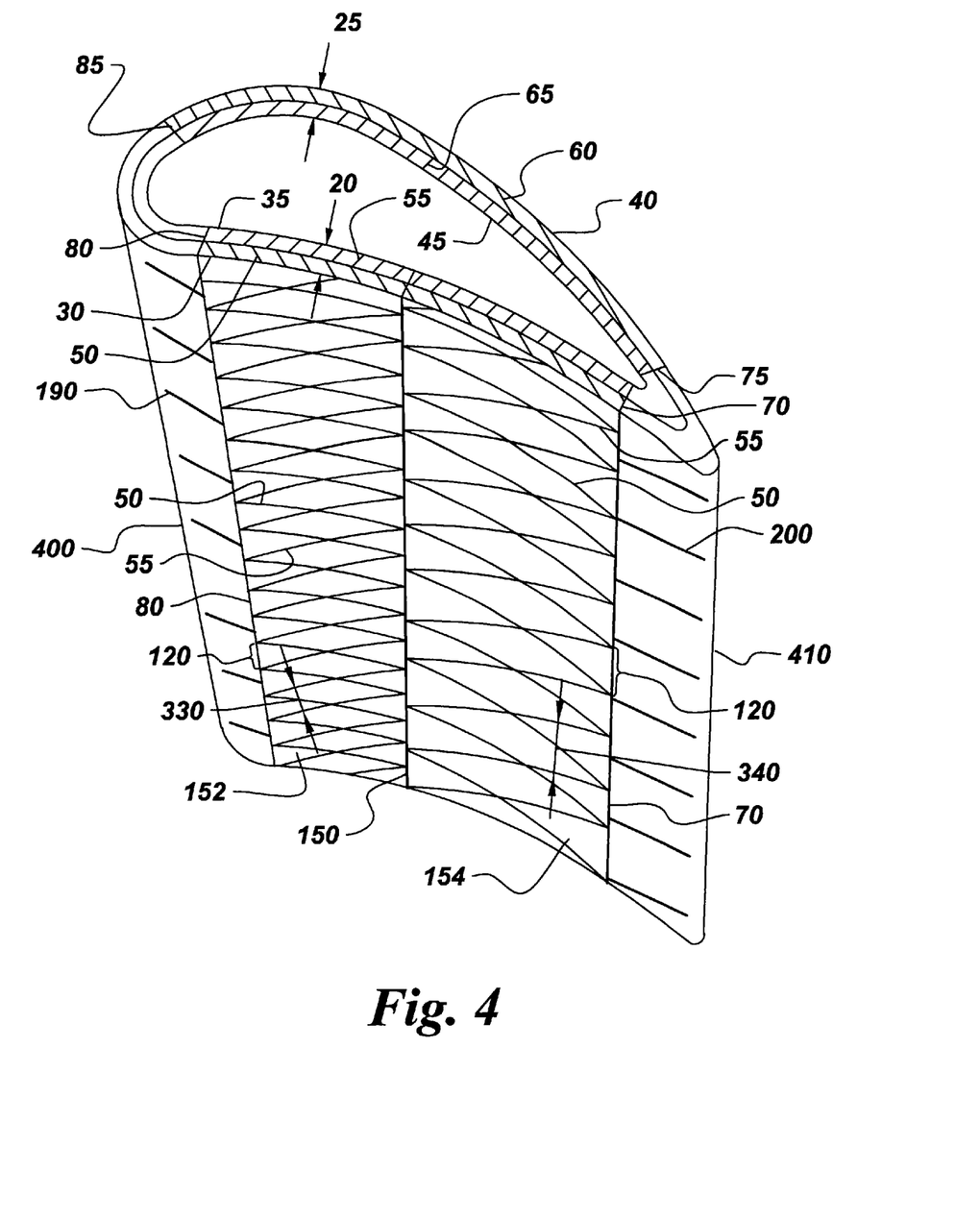
FIG. 4 a cross sectional view of the turbine blade comprising the leading pressure edge cooling section and the trailing pressure edge cooling section in accordance with one embodiment of the present invention.

In one embodiment of the present invention, the turbine blade 10 of FIG. 4 comprises the external pressure side plate 30, the internal pressure side plate 35, the external suction side plate 40, the internal suction side plate 45, the plurality of pressure flow redirection areas 120, and the plurality of suction flow redirection areas 125 of FIG. 3. The external pressure side plate 30 is disposed over the internal pressure side plate 35 to form the pressure side double wall 20. The external suction side plate 40 is disposed over the internal suction side plate 45 to form the suction side double wall 25. The external pressure ribs 50 and the internal pressure ribs 55 are disposed as described above with reference to FIG. 2.

The external suction ribs 60 of FIG. 3 are disposed at the first angle 130 with respect to the blade span reference line 110 and the internal suction ribs 65 are disposed at the second angle 140 with respect to the blade span reference line 110 to form the suction flow redirection areas 125. The pressure side double wall 20 of FIG. 1 is configured to pass the portion of the coolant 180 through the pressure side double wall 20, and the suction side double wall 25 is configured so as to pass the another portion of the coolant 180 through the suction side double wall 25.

In one embodiment of the present invention, the external suction ribs 60 of FIG. 3 and the internal suction ribs 65 are spaced apart in the rib spacing 328. The final rib spacing 328 is determined by the artisan, and the present invention is not limited to a particular rib spacing 328. The artisan typically considers at least one of following variables that are determined by the artisan: 1) the width of the suction side double wall 25; 2) the allowable pressure drop of the coolant 180 of FIG. 1 through the suction side double wall 25; and 3) the heat load to be removed by the coolant 180 flowing through the suction side double wall 25.

In one embodiment of the present invention, a leading suction edge cover 85 of FIG. 4 is disposed to the external suction side plate 40 and the internal suction side plate 45. A trailing suction edge cover 75 is disposed to the external suction side plate 40 and the internal suction side plate 45. In one embodiment of the present invention, the external suction side plate 40, the internal suction side plate 45, the leading suction edge cover 85, and the trailing suction edge cover 75 are disposed in an investment casting.

In another specific embodiment of the present invention, the external pressure side plate 30, the internal pressure side plate 35, the leading pressure edge cover 80, the trailing pressure edge cover 70, the external suction side plate 40, the internal suction side plate 45, the trailing suction edge cover 75, and the leading suction edge cover 85 are disposed in an investment casting.

In one embodiment of the present invention, the pressure side double wall 20 and the suction side double wall 25 are both disposed from about the blade root 100 of FIG. 1 to about the blade cover 90. The determination of the final deposition of the pressure side double wall 20 and the suction side double wall 25 with reference to the blade cover 90 and the blade root 100 is left to the artisan. The present invention is not limited to disposing at least one of the pressure side double wall 20 and the suction side double wall 25 from the blade root 100 to the blade cover 90 as shown in FIG. 1.

In one embodiment of the present invention, the pressure side double wall 20 of FIG. 4 is spaced apart from both a blade leading edge 400 and a blade trailing edge 410. The disposition of the pressure side double wall 20, as shown in FIG. 4, is not intended to imply a limitation to the present invention. The final disposition of the pressure side double wall 20 is determined by the artisan and is not limited to disposing the leading pressure edge cover 80 in a spaced apart relation to the blade leading edge 400, and disposing the trailing pressure edge cover 70 in a spaced apart relation to the blade trailing edge 410 as shown in FIG. 4.

In the present invention, the disposition of the pressure side double wall 20 and the suction side double wall 25 with reference to the turbine blade 10 is consistent with the approach used to determine the disposition of the cooling apparatus 20 of FIG. 1 of RD-29163 as provided in the commonly assigned patent application General Electric Docket No. RD-29163, Turbine Blade Core Cooling Apparatus and Method of Fabrication, R. S. Bunker et al., filed concurrently herewith and incorporated herein by reference in its entirety. The cooling apparatus 20 of FIG. 1 of RD-29163 controls the coolant 180 within the turbine blade 10 of FIG. 2 of RD-29163 and the cooling apparatus 20 of FIG. 1 of RD-29163 is sized and disposed by the artisan to accommodate the final design requirements.

In another specific embodiment of the present invention, a pressure side dividing rib 150 of FIG. 4 is disposed between the external pressure side plate 30 and the internal pressure side plate 35, where the pressure side dividing rib 150 divides the pressure side double wall 20 into a leading pressure edge section 152 and a trailing pressure edge section 154. While an embodiment of the present invention comprising one pressure side dividing rib 150 is described, an embodiment where a multiple pressure side dividing ribs 150 are disposed between the external pressure side plate 30 and the internal pressure side plate 35 is available to the artisan. The present invention is not limited to disposing one pressure side dividing rib 150 as depicted in FIG. 4. In other embodiments, for example, multiple pressure side dividing ribs 150 are used to split the pressure side double wall 20 into three or more sections.

As used herein, the term "pressure side dividing rib" is used to describe an element that is disposed adjacent to at least a portion of both the external pressure side plate 30 and the internal pressure side plate 35.

In another specific embodiment of the present invention, the external pressure side plate 30, the internal pressure side plate 35, the leading pressure edge cover 80, the trailing pressure edge cover 70, and the pressure side dividing rib 150 are disposed in an investment casting.

In another specific embodiment of the present invention, the external pressure side plate 30, the internal pressure side plate 35, the leading pressure edge cover 80, the trailing pressure edge cover 70, the external suction side plate 40, the internal suction side plate 45, the trailing suction edge cover 75, the leading suction edge cover 85, and the pressure side dividing rib 150 are disposed in an investment casting.

In one embodiment of the present invention, the leading pressure edge section 152 has a first rib spacing 330 and the trailing pressure edge section 154 has a second rib spacing 340. The first rib spacing 330 and the second rib spacing 340 are configured to control a first portion of the coolant 180 in the leading pressure edge section 152 and a second portion of the coolant 180 in the trailing pressure edge section 154, respectively.

In one embodiment of the present invention, the leading pressure edge section 152 is further configured with at least one airfoil leading edge cooling ejections 190, where the trailing pressure edge section 154 is further configured with at least one airfoil trailing edge cooling ejections 200.

The present invention is not limited to the embodiment comprising at least one of the airfoil leading edge cooling ejections 190 and the airfoil trailing edge cooling ejections 200, as shown in FIG. 4. Film-cooling techniques are well known to one skilled in the art. Therefore the final disposition of any bleed-off film cooling holes (not shown in FIG. 4 or FIG. 5), penetrations (not shown in FIG. 4 or FIG. 5), airfoil leading edge cooling ejections 190 of FIG. 4, and the airfoil trailing edge cooling ejections 200 in at least one of the external pressure side plate 30 and the external suction side plate 40 are determined by the artisan.

Figure 5:
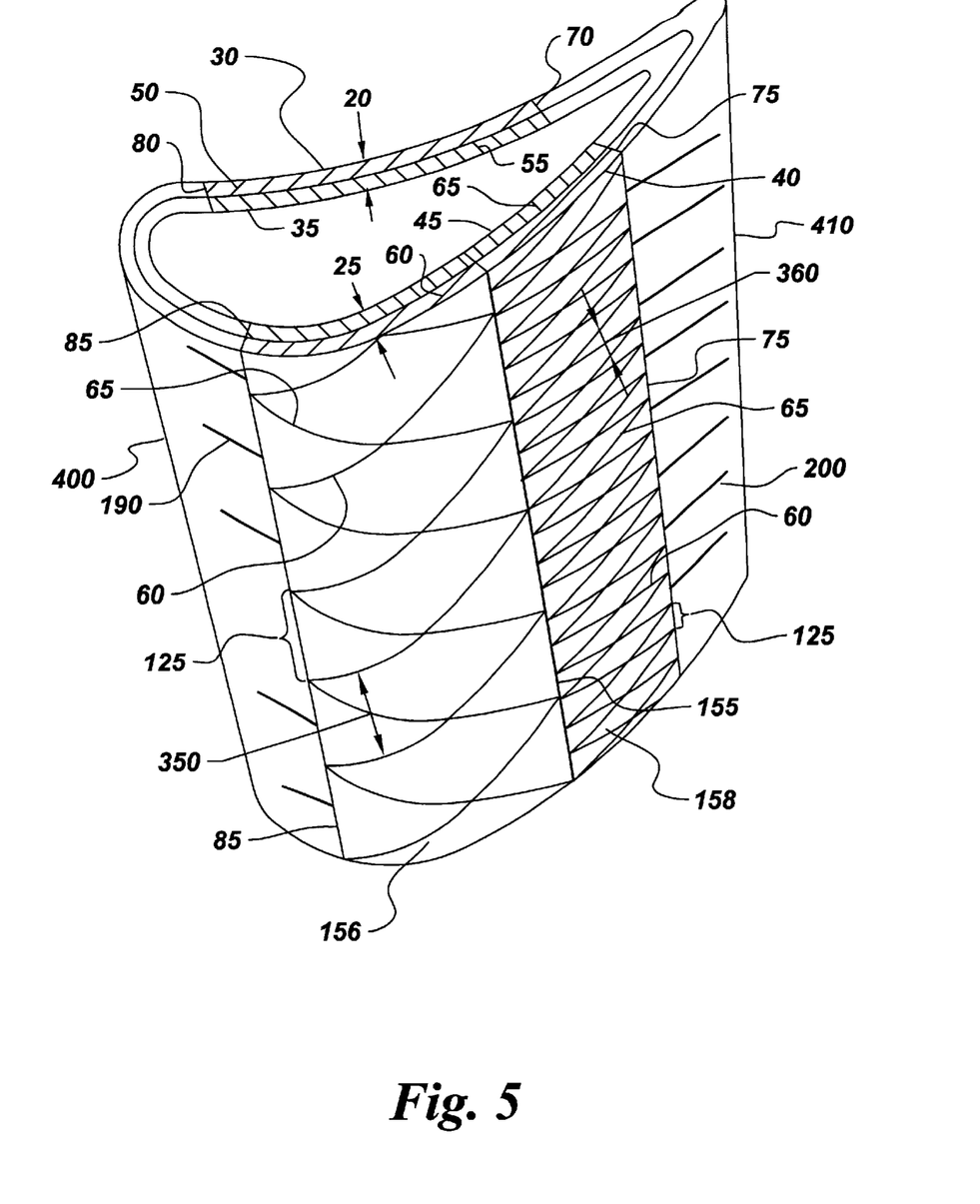
FIG. 5 a cross sectional view of the turbine blade comprising the leading suction edge cooling section and the trailing suction edge cooling section in accordance with one embodiment of the present invention.

In one embodiment of the present invention, as shown in FIG. 5 the turbine blade 10 further comprises a suction side dividing rib 155 disposed between the external suction side plate 40 and the internal suction side plate 45. The suction side dividing rib 155 divides the suction side double wall 25 into a leading suction edge section 156 and a trailing suction edge section 158. While an embodiment of the present invention comprising one suction side dividing rib 155 is described, an embodiment where a multiple suction side dividing ribs 155 are disposed between the external suction side plate 40 and the internal suction side plate 45 is available to the artisan. The present invention is not limited to disposing one suction side dividing rib 155 as depicted in FIG. 5. In other embodiments, for example, multiple suction side dividing ribs 155 are used to split the suction side double wall 25 into three or more sections.

As used herein, the term "suction side dividing rib" is used to describe an element that is disposed adjacent to at least a portion of both the external suction side plate 40 and the internal suction side plate 45.

In one embodiment of the present invention, the suction side double wall 25 is spaced apart from both the blade leading edge 400 and the blade trailing edge 410. The disposition of the suction side double wall 25, as shown in FIG. 5, is not intended to imply a limitation to the present invention. The final disposition of the suction side double wall 25 is determined by the artisan and is not limited to disposing the leading suction edge cover 85 in a spaced apart relation to the blade leading edge 400, and disposing the trailing suction edge cover 75 in a spaced apart relation to the blade trailing edge 410 as shown in FIG. 5.

In one embodiment of the present invention, the external pressure side plate 30 of FIG. 5, the internal pressure side plate 35, the external suction side plate 40, the internal suction side plate 45, the leading pressure edge cover 80, the trailing pressure edge cover 80, the trailing suction edge cover 75, the leading suction edge cover 85, and the suction side dividing rib 155 are disposed in an investment casting.

In a more specific embodiment of the present invention, the external pressure side plate 30 of FIG. 4, the internal pressure side plate 35, the external suction side plate 40, the internal suction side plate 45, the leading pressure edge cover 80, the trailing pressure edge cover 70, the trailing suction edge cover 75, the leading suction edge cover 85, the pressure side dividing rib 150, and the suction side dividing rib 155 of FIG. 5 are disposed in an investment casting.

In one embodiment of the present invention, the leading suction edge section 156 has a third rib spacing 350 and the trailing suction edge section 158 has a fourth rib spacing 360. In one embodiment of the present invention, the third rib spacing 350 and the fourth rib spacing 360 are configured to control a third portion of the coolant 180 in the leading suction edge section 156 and a fourth portion of the coolant 180 in the trailing suction edge section 158, respectively.

In one embodiment of the present invention, the leading suction edge section 156 is further configured with at least one airfoil leading edge cooling ejection 190 and the trailing suction edge section 158 is further configured with at least one airfoil trailing edge cooling ejection 200.

Figure 6:
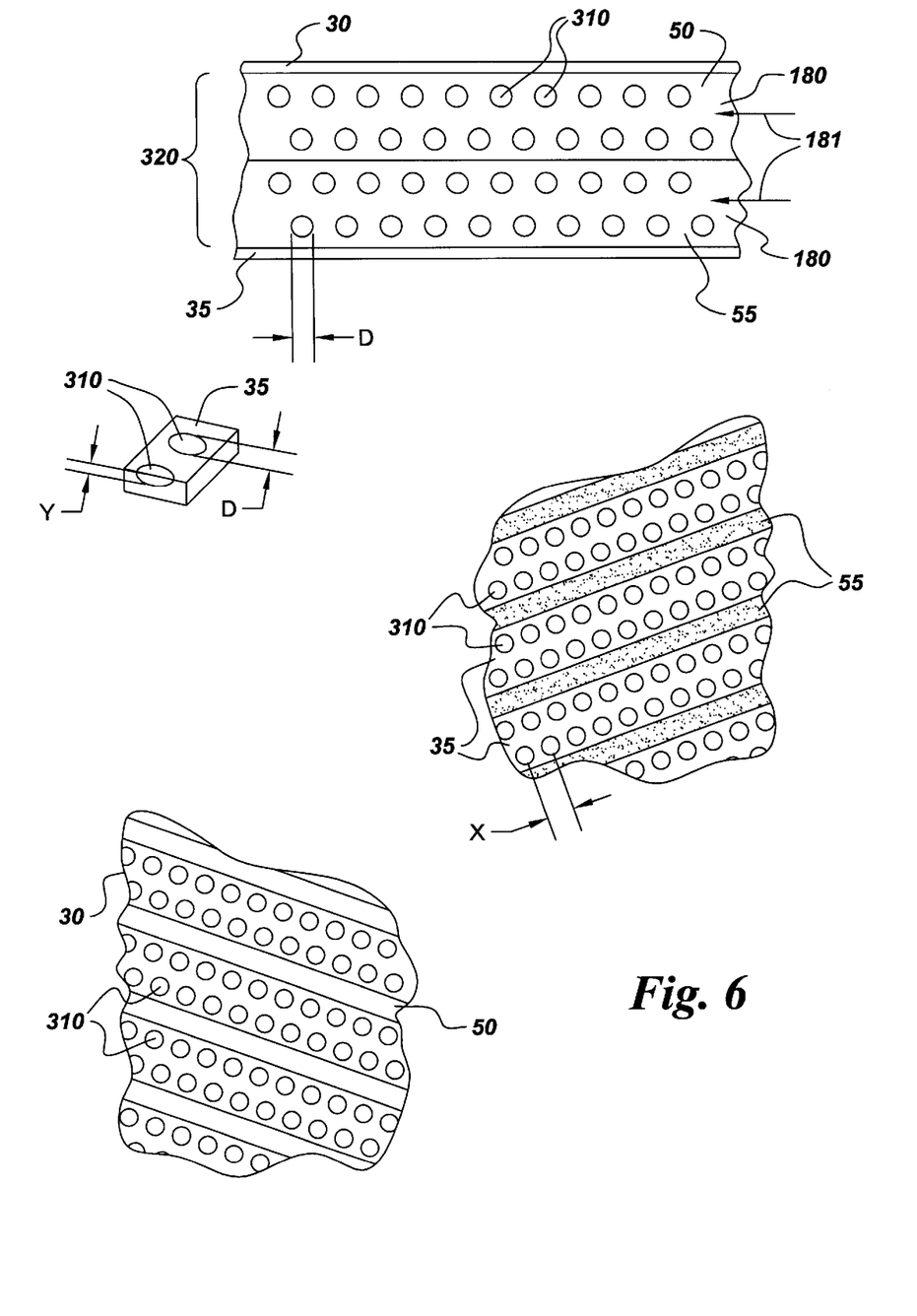
FIG. 6 is a cross sectional view of the pressure side double wall in accordance with one embodiment of the present invention.

In one embodiment of the present invention, as depicted in FIG. 6, the pressure side double wall 20 further comprises a plurality of surface concavities 310, where at least a portion of at least one of the external pressure ribs 50, the internal pressure ribs 55, the external pressure side plate 30, and the internal pressure side plate 35 that is disposed to contact the coolant 180 is configured with the plurality of concavities 310 thereon.

As used herein, the term "concavity" refers to depressions, indentations, dimples, pits or any other type or shape of a discrete sinkhole. In one embodiment, the shape of concavities 310 is typically hemispherical or inverted and truncated conically shaped. In an alternative embodiment, the shape of concavities 310 is typically any sector of a full hemisphere.

Figure 7:
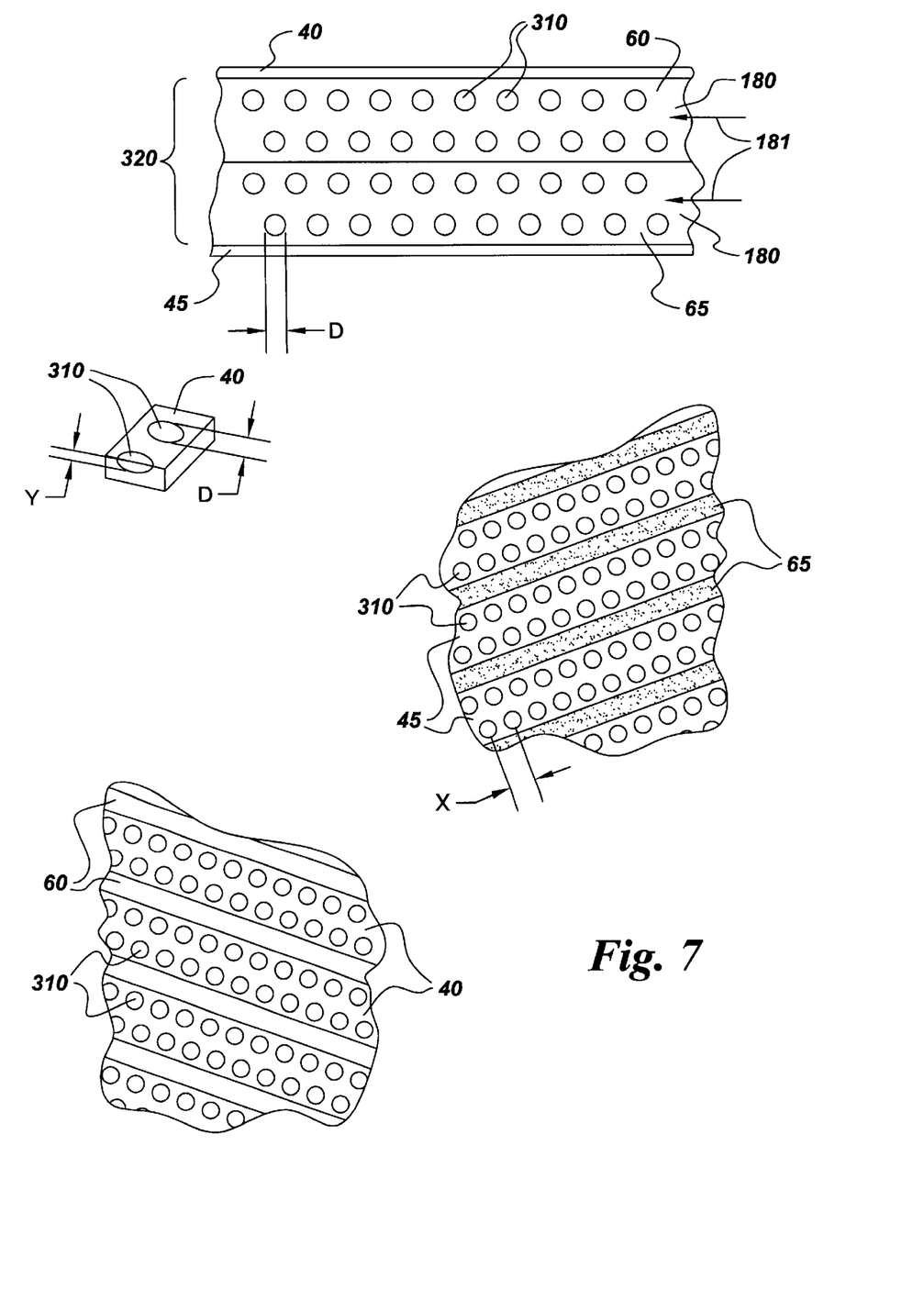
FIG. 7 is a cross sectional view of the suction side double wall in accordance with one embodiment of the present invention.

In one embodiment of the present invention, the maximum depth "Y" of FIGS. 6 and 7 of each of the concavities 310 typically remains constant along the surface of the pressure side plate 30, suction side plate 40, pressure rib 50, and suction rib 60. The maximum depth "Y" is generally in the range from about 0.10 to about 0.50 times the concavity surface diameter "D". In addition, the maximum depth Y of the concavities 310 is in the range from about 0.002 inches to about 0.125 inches. The center-to-center spacing "X" of the concavities 310 is generally in the range from about 1.1 to about 2 times the surface diameter "D" of the concavities 310.

In one embodiment of the present invention, as depicted in FIG. 7, the suction side double wall 25 further comprises the plurality of concavities 310, where at least a portion of at least one of the external suction ribs 60, the internal suction ribs 65, the external suction side plate 40, the internal suction side plate 45, the external pressure ribs 50, the internal pressure ribs 55, the external pressure side plate 30, and the internal pressure side plate 35 that is disposed to contact the coolant 180 is configured with the plurality of concavities 310 thereon.

The present invention provides a method embodiment for fabricating the pressure side double wall 20 of FIG. 1 for a turbine blade 10. The method in one embodiment of the present invention comprises aligning the external pressure side plate 30 and the internal pressure side plate 35 to form the plurality of pressure flow redirection areas 120 of FIG. 2 between the external pressure side plate 30 and the internal pressure side plate 35. The external pressure side plate 30 comprises the plurality of external pressure ribs 50 disposed at the first angle 130 with respect to the blade span reference line 110, and the internal pressure side plate 35 comprises the plurality of internal pressure ribs 55 disposed at the second angle 140 with respect to the blade span reference line 110.

In one embodiment of the present invention, the first angle 130 and the second angle 140 have ranges as described above with respect to FIG. 2.

The method, in one embodiment of the present invention, further comprises, prior to aligning, fabricating the external pressure side plate 30 and the internal pressure side plate 35 by a process selected from a group consisting of investment casting, diffusion bonding, electron beam deposition, and any combination thereof.

The method, in one embodiment of the present invention, aligning further comprises providing the investment casting mold, which comprises the pressure flow redirection areas 120, the external pressure ribs 50, and the internal pressure ribs 55; and pouring a blade material to form the investment casting. The investment casting comprises the external pressure side plate 30, the internal pressure side plate 35, the external pressure ribs 50, and the internal pressure ribs 55.

The method, in one embodiment of the present invention, where aligning comprises joining the external pressure side plate 30 and the internal pressure side plate 35.

The method, in one embodiment of the present invention, where the pressure side double wall 20 is disposed from about the blade root 100 of FIG. 1 to about the blade cover 90. The method, in one embodiment of the present invention, where the suction side double wall 25 of FIG. 1 is disposed from about the blade root 100 to about the blade cover 90 of turbine blade 10.

The present invention provides a method embodiment for fabricating the suction side double wall 20 of FIG. 1 for a turbine blade 10. The method in one embodiment of the present invention comprises aligning the external suction side plate 40 of FIG. 3 and the internal suction side plate 45 to form the plurality of suction flow redirection areas 125 between the external suction side plate 40 and the internal suction side plate 45. The external suction side plate 40 comprises the plurality of external suction ribs 60 disposed at the first angle 130 with respect to the blade span reference line 110, and the internal suction side plate 45 comprises the plurality of internal suction ribs 65 disposed at the second angle 140 with respect to the blade span reference line 110. In one embodiment of the present invention, the first angle 130 and the second angle 140 have ranges as described above with respect to FIG. 3.

The method, in one embodiment of the present invention, further comprises, prior to aligning, fabricating the external suction side plate 40 and the internal suction side plate 45 by the process selected from a group consisting of investment casting, diffusion bonding, electron beam deposition, and any combination thereof.

The method, in one embodiment of the present invention, where aligning comprises providing the investment casting mold which comprises the suction flow redirection areas 125, the external suction ribs 60, and the internal suction ribs 65; and pouring the blade material to form the investment casting. The investment casting comprises the external suction side plate 40, the internal suction side plate 45, the external suction ribs 60, and the internal suction ribs 65.

The method, in one embodiment of the present invention, where aligning comprises joining the external suction side plate 40 and the internal suction side plate 45.

The method, in one embodiment of the present invention, further comprises inserting the pressure side dividing rib 150 of FIG. 4 from the external pressure side plate 30 to the internal pressure side plate 35, where the pressure side dividing rib 150 divides the pressure side double wall 20 into the leading pressure edge section 152 and the trailing pressure edge cooling section 154.

The method, in one embodiment of the present invention, further comprises spacing the external pressure ribs 50 and the internal pressure ribs 55 in the first rib spacing 330 for leading pressure edge section 152, and spacing the external pressure ribs 50 and the internal pressure ribs 55 in the second rib spacing 340 for the trailing edge cooling section 154. The first rib spacing 330 and the second rib spacing 340 are configured to control the first portion of the coolant 180 in the leading pressure edge section 152 and the second portion of the coolant 180 in the trailing pressure edge section 154, respectively.

The method, in one embodiment of the present invention, where the leading pressure edge section 152 is aligned to the at least one airfoil leading edge cooling ejection 190 and where the trailing pressure edge section 154 is aligned to the at least one airfoil trailing edge cooling ejection 200.

The method, in one embodiment of the present invention, further comprises disposing the suction side dividing rib 155 of FIG. 5 from the external suction side plate 40 to the internal suction side plate 45. The suction side dividing rib 155 divides the suction side double wall 25 into the leading suction edge section 156 and the trailing suction edge cooling section 158.

The method, in one embodiment of the present invention, further comprises spacing the external suction ribs 60 and the internal suction ribs 65 in the third rib spacing 350 for the leading suction edge section 156 and spacing the external suction ribs 60 and the internal suction ribs 65 in the forth rib spacing 360 for the trailing suction edge section 158. The third rib spacing 350 and the fourth rib spacing 360 are configured to control the third portion of the coolant 180 in the leading suction edge section 156 and the fourth portion of the coolant 180 in the trailing suction edge section 158, respectively.

The method, in one embodiment of the present invention, the leading suction edge section 156 is aligned to the at least one airfoil leading edge cooling ejection 190 and the trailing suction edge section 158 is aligned to the at least one airfoil trailing edge cooling ejection 200.

The method, in one embodiment of the present invention, further comprises disposing at least one portion of at least one of the external pressure side plate 30 of FIG. 6, the internal pressure side plate 35, the external pressure ribs 50, and the internal pressure ribs 55 that is configured to contact the coolant 180 with the plurality of concavities 310 thereon.

The method, in one embodiment of the present invention, further comprises disposing at least a portion of at least one of the external suction side plate 40 of FIG. 7, the internal suction side plate 45, the external suction ribs 60, and the internal suction ribs 65 that is configured to contact the coolant 180 with the plurality of concavities 310 thereon.

The present invention provides an alternative method of fabricating the pressure side double wall 20 of FIG. 1 for the turbine blade 10 comprises constructing a pressure lattice structure 320 of FIG. 6 comprising the plurality of external pressure ribs 50, the plurality of internal pressure ribs 55, and the plurality of pressure flow redirection areas 120 of FIG. 2. In one embodiment of the present invention, the external pressure ribs 50 are disposed at the first angle 130 with respect to the blade span reference line 110 and the internal pressure ribs 55 are disposed at the second angle 140 with respect to the blade span reference line 110 to form the plurality of pressure flow redirection areas 120. The external pressure side plate 30 is aligned over the internal pressure side plate 35.

In one embodiment of the present invention, the alternative method further comprises processing the pressure lattice structure 320 of FIG. 6 to form the pressure side double wall 20, where the pressure side double wall 20 comprises the external pressure side plate 30 and the internal pressure side plate 35. The external pressure side plate 30 comprises the external pressure ribs 50 and the internal pressure side plate 35 comprises the internal pressure side ribs 55.

In one embodiment of the present invention, the alternative method further comprises constructing the suction lattice structure 325 of FIG. 7 comprising the plurality of external suction ribs 60, the plurality of internal suction ribs 65, and the plurality of suction flow redirection areas 125 of FIG. 3. In one embodiment of the present invention, the external suction ribs 60 are disposed at the first angle 130 with respect to the blade span reference line 110 and the internal suction ribs 65 are disposed at the second angle 140 with respect to the blade span reference line 110 to form the plurality of suction flow redirection areas 125. The external suction side plate 40 is aligned over the internal suction side plate 45.

In one embodiment of the present invention, the method further comprises processing the suction lattice structure 325 of FIG. 7 to form the suction side double wall 25, where the suction side double wall 25 comprises the external suction side plate 40 and the internal suction side plate 45. The external suction side plate 40 comprises the external suction ribs 60 and the internal suction side plate 45 comprises the internal suction side ribs 65.

In one embodiment of the present invention, the pressure side double wall 20 is configured to pass one portion of the coolant 180 through the pressure side double wall 20 and the suction side double wall 25 is configured to pass another portion of the coolant 180 through the suction side double wall 25.

The method, in one embodiment of the present invention, where processing the pressure lattice structure 320 of FIG. 6 and processing the suction lattice structure 325 of FIG. 7 is performed by processes selected from the group consisting of investment casting, diffusion bonding, electron beam, and any combination thereof.

The method, in one embodiment of the present invention, further comprises disposing the leading pressure edge cover 80 of FIG. 4 to the external pressure side plate 30 and the internal pressure side plate 35. The method, in one embodiment of the present invention, further comprises disposing the trailing pressure edge cover 70 to the external pressure side plate 30 and the internal pressure side plate 35. The method, in one embodiment of the present invention, further comprises disposing the leading suction edge cover 85 to the external suction side plate 40 and the internal suction side plate 45. The method, in one embodiment of the present invention, further comprises disposing the trailing suction edge cover 75 to the external suction side plate 40 and the internal suction side plate 45.

The method, in one embodiment of the present invention, where the external pressure ribs 50, the internal pressure ribs 55, the external suction ribs 60, the internal suction ribs 65, the external pressure side plate 30, the internal pressure side plate 35, the external suction side plate 40, the internal suction side plate 45, the leading pressure edge cover 80, the trailing pressure edge cover 80, the trailing suction edge cover 75, the leading suction edge cover 85, the pressure side dividing rib 150, and the suction side dividing rib 155 of FIG. 5 are disposed in the investment casting.

The foregoing description of several embodiments of the present invention has been presented for purposes of illustration. Although the invention has been described and illustrated in detail, it is to be clearly understood that the same is intended by way of illustration and example only and is not to be taken by way of limitation. Obviously many modifications and variations of the present invention are possible in light of the above teaching. Accordingly, the spirit and scope of the present invention are to be limited only by the terms of the appended claims.

What is claimed is:

1. A pressure side double wall for a turbine blade comprising:
   an external pressure side plate comprising a plurality of external pressure ribs;
   an internal pressure side plate comprising a plurality of internal pressure ribs; and
   a plurality of pressure flow redirection areas;
   said external pressure side plate disposed over said internal pressure side plate so as to form said pressure side double wall;
   wherein said external pressure ribs are disposed at a first angle with respect to a blade span reference line and said internal pressure ribs are disposed at a second angle with respect to said blade span reference line so as to form said pressure flow redirection areas;
   wherein said pressure side double wall is configured so as to pass a coolant through said pressure side double wall.

2. The apparatus of claim 1, wherein said first angle has a range from about 25 degrees to about 55 degrees, wherein said second angle has a range from about −25 to about −55 degrees.

3. The apparatus of claim 1, wherein said first angle has a range from about 40 degrees to about 45 degrees, wherein said second angle has a range from about −40 to about −45 degrees.

4. The apparatus of claim 1, wherein said first angle has a range from about −25 degrees to about −55 degrees, wherein said second angle has a range from about 25 to about 55 degrees.

5. The apparatus of claim 1, wherein said first angle has a range from about −40 degrees to about −45 degrees, wherein said second angle has a range from about 40 to about 45 degrees.

6. The apparatus of claim 1 further comprising a plurality of concavities;
   wherein at least a portion of at least one of said external pressure ribs, said internal pressure ribs, said external pressure side plate, and said internal pressure side plate that is disposed to contact said coolant is configured with said plurality of concavities thereon.

7. The apparatus of claim 1 further comprising:
   a pressure side dividing rib disposed between said external pressure side plate and said internal pressure side plate;
   wherein said pressure side dividing rib divides said pressure side double wall into a leading pressure edge section and a trailing pressure edge section.

8. The apparatus of claim 7 further comprising a leading pressure edge cover and a trailing pressure edge cover;
   wherein said leading pressure edge cover is disposed to said external pressure side plate and said internal pressure side plate;
   wherein said trailing pressure edge cover is disposed to said external pressure side plate and said internal pressure side plate;
   wherein said external pressure side plate, said internal pressure side plate, said leading pressure edge cover, said trailing pressure edge cover, and said pressure side dividing rib are disposed in an investment casting.

9. The apparatus of claim 7 wherein said leading pressure edge section has a first rib spacing and said trailing pressure edge section has a second rib spacing;

wherein said first rib spacing and said second rib spacings are configured to control a first portion of said coolant in said leading pressure edge section and a second portion of said coolant in said trailing pressure edge section, respectively.

10. The apparatus of claim 7 wherein said leading pressure edge section is further configured with at least one airfoil leading edge cooling ejection;

wherein said trailing pressure edge section is further configured with at least one airfoil trailing edge cooling ejection.

11. The apparatus of claim 1, further comprising:

a suction side double wall;

an external suction side plate comprising a plurality of external suction ribs;

an internal suction side plate comprising a plurality of internal suction ribs;

a plurality of suction flow redirection areas; and said external suction side plate disposed over said internal suction side plate so as to form said suction side double wall;

wherein said external suction ribs are disposed at said first angle with respect to said blade span reference line and said internal suction ribs are disposed at said second angle with respect to said blade span reference line so as to form said suction flow redirection areas;

wherein said suction side double wall is configured so as to pass a portion of said coolant through said pressure side double wall.

12. The apparatus of claim 11, wherein said first angle has a range from about 25 degrees to about 55 degrees, wherein said second angle has a range from about −25 to about −55 degrees.

13. The apparatus of claim 11, wherein said first angle has a range from about 40 degrees to about 45 degrees, wherein said second angle said has a range from about −40 to about −45 degrees.

14. The apparatus of claim 11, wherein said first angle has a range from about −25 degrees to about −55 degrees, wherein said second angle has a range from about 25 to about 55 degrees.

15. The apparatus of claim 11, wherein said first angle has a range from about −40 degrees to about −45 degrees, wherein said second angle has a range from about 40 to about 45 degrees.

16. The apparatus of claim 11 further comprising a plurality of concavities (310);

wherein at least a portion of at least one of said external suction ribs, said internal suction ribs, said external suction side plate, said internal suction side plate, said external pressure ribs, said internal pressure ribs, said external pressure side plate, and said internal pressure side plate that is disposed to contact said coolant is configured with said plurality of concavities thereon.

17. The apparatus of claim 11, wherein said pressure side double wall and said suction side double wall are disposed from about a blade root to about a blade cover.

18. The apparatus of claim 11 further comprising:

a leading pressure edge cover;

a trailing pressure edge cover;

a leading suction edge cover;

a trailing suction edge cover;

wherein said leading pressure edge cover is disposed to said external pressure side plate and said internal pressure side plate;

wherein said trailing pressure edge cover is disposed to said external pressure side plate and said internal pressure side plate;

wherein said leading suction edge cover is disposed to said external suction side plate and said internal suction side plate;

wherein said trailing suction edge cover is disposed to said external suction side plate and said internal suction side plate;

wherein said external pressure side plate, said internal pressure side plate, said external suction side plate, said internal suction side plate, said leading pressure edge cover, said trailing pressure edge cover, said trailing suction edge cover, and said leading suction edge cover are disposed in an investment casting.

19. The apparatus of claim 18 further comprising:

a suction side dividing rib disposed between said external suction side plate and said internal suction side plate;

wherein said suction side dividing rib divides said suction side double wall into a leading suction edge section and a trailing suction edge section;

wherein said external pressure side plate, said internal pressure side plate, said external suction side plate, said internal suction side plate, said leading pressure edge cover, said trailing pressure edge cover, said trailing suction edge cover, said leading suction edge cover and said suction side dividing rib are disposed in an investment casting.

20. The apparatus of claim 19 further comprising:

a pressure side dividing rib disposed between said external pressure side plate and said internal pressure side plate;

wherein said pressure side dividing rib divides said pressure side double wall into a leading pressure edge section and a trailing pressure edge section;

wherein said external pressure side plate, said internal pressure side plate, said external suction side plate, said internal suction side plate, said leading pressure edge cover, said trailing pressure edge cover, said trailing suction edge cover, said leading suction edge cover, said pressure side dividing rib, and said suction side dividing rib are disposed in an investment casting.

21. The apparatus of claim 20, wherein said leading pressure edge section has a first rib spacing and said trailing pressure edge section has a second rib spacing;

wherein said first rib spacing and said second rib spacings are configured to control a first portion of said coolant in said leading pressure edge section and a second portion of said coolant in said trailing pressure edge section, respectively;

wherein said leading suction edge section has a third rib spacing and said trailing suction edge section has a fourth rib spacing;

wherein said third rib spacing and said fourth rib spacings are configured to control a third portion of said coolant in said leading suction edge section and a fourth portion of said coolant in said trailing suction edge section, respectively.

22. The apparatus of claim 21 wherein said leading pressure edge section is further configured with at least one airfoil leading edge cooling ejection;

wherein said trailing pressure edge section is further configured with at least one airfoil trailing edge cooling ejection;

wherein said leading suction edge section is further configured with said at least one airfoil leading edge cooling ejection;

wherein said trailing suction edge section is further configured with said at least one airfoil trailing edge cooling ejection.

23. A turbine blade comprising:
a external pressure side plate comprising a plurality of external pressure ribs;
an internal pressure side plate comprising a plurality of internal pressure ribs;
an external suction side plate comprising a plurality of external suction ribs;
an internal suction side plate comprising a plurality of internal suction ribs;
a plurality of pressure flow redirection areas;
a plurality of suction flow redirection areas;
said external pressure side plate disposed over said internal pressure side plate so as to form a pressure side double wall; and
said external suction side plate disposed over said internal suction side plate so as to form a suction side double wall;
wherein said external pressure ribs are disposed at a first angle with respect to a blade span reference line and said internal pressure ribs are disposed at a second angle with respect to said blade span reference line so as to form said pressure flow redirection areas;
wherein said external suction ribs are disposed at said first angle with respect to said blade span reference line and said internal suction ribs are disposed at said second angle with respect to said blade span reference line so as to form said suction flow redirection areas;
wherein said pressure side double wall is configured so as to pass a portion of a coolant through said pressure side double wall;
wherein said suction side double wall is configured so as to pass said another portion of said coolant through said suction side double wall.

24. The apparatus of claim 23, wherein said first angle has a range from about 25 degrees to about 55 degrees, wherein said second angle has a range from about −25 to about −55 degrees.

25. The apparatus of claim 23, wherein said first angle has a range from about 40 degrees to about 45 degrees, wherein said second angle has a range from about −40 to about −45 degrees.

26. The apparatus of claim 23, wherein said first angle has a range from about −25 degrees to about −55 degrees, wherein said second angle has a range from about 25 to about 55 degrees.

27. The apparatus of claim 23, wherein said first angle has a range from about −40 degrees to about −45 degrees, wherein said second angle has a range from about 40 to about 45 degrees.

28. The apparatus of claim 23 further comprising a plurality of concavities;
wherein at least a portion of at least one of said external suction ribs, said internal suction ribs, said external suction side plate, said internal suction side plate, said external pressure ribs, said internal pressure ribs, said external pressure side plate, and said internal pressure side plate that is disposed to contact said coolant is configured with said plurality of concavities thereon.

29. The apparatus of claim 23 further comprising:
a pressure side dividing rib disposed between said external pressure side plate and said internal pressure side plate;
wherein said pressure side dividing rib divides said pressure side double wall into a leading pressure edge section and a trailing pressure edge section.

30. The apparatus of claim 29 further comprising:
a suction side dividing rib is disposed between said external suction side plate and said internal suction side plate;
wherein said suction side dividing rib divides said suction side double wall into a leading suction edge section and a trailing suction edge section.

31. The apparatus of claim 30 further comprising a leading pressure edge cover, a trailing pressure edge cover, a leading suction edge cover, and a trailing suction edge cover;
wherein said leading pressure edge cover is disposed to said external pressure side plate and said internal pressure side plate;
wherein said trailing pressure edge cover is disposed to said external pressure side plate and said internal pressure side plate;
wherein said leading suction edge cover is disposed to said external suction side plate and said internal suction side plate;
wherein said trailing suction edge cover is disposed to said external suction side plate and said internal suction side plate;
wherein said external pressure ribs, said internal pressure ribs, said external suction ribs, said internal suction ribs, said external pressure side plate, said internal pressure side plate, said external suction side plate, said internal suction side plate, said leading pressure edge cover, said trailing pressure edge cover, said leading suction edge cover, said trailing suction edge cover, said pressure side dividing rib, and said suction side dividing rib are disposed in an investment casting.

32. The apparatus of claim 31 wherein said leading pressure edge section has a first rib spacing and said trailing pressure edge section has a second rib spacing,
wherein said first rib spacing and said second rib spacings are configured to control a first portion of said coolant in said leading pressure edge section and a second portion of said coolant in said trailing pressure edge section, respectively;
wherein said leading suction edge section has a third rib spacing and said trailing suction edge section has a fourth rib spacing;
wherein said third rib spacing and said fourth rib spacing are configured to control a third portion of said coolant in said leading suction edge section and a fourth portion of said coolant in said trailing suction edge section, respectively.

33. The apparatus of claim 32, wherein said leading pressure edge section is further configured with at least one airfoil leading edge cooling ejection;
wherein said trailing pressure edge section is further configured with at least one airfoil trailing edge cooling ejection.

34. The apparatus of claim 33, wherein said leading suction edge section is further configured with at least one airfoil leading edge cooling ejection;
wherein said trailing suction edge section is further configured with at least one airfoil trailing edge cooling ejection.

35. A method of fabricating a pressure side double wall for a turbine blade comprising:

aligning an external pressure side plate, said external pressure side plate comprising a plurality of external pressure ribs disposed at a first angle with respect to a blade span reference line, and an internal pressure side plate comprising a plurality of internal pressure ribs disposed at a second angle with respect to said blade span reference line, to form a plurality of pressure flow redirection areas between said external pressure side plate and said internal pressure side plate.

36. The method of claim 35, wherein said first angle has a range from about 25 degrees to about 55 degrees, wherein said second angle has a range from about −25 to about −55 degrees.

37. The method of claim 35, wherein said first angle has a range from about 40 degrees to about 45 degrees, wherein said second angle has a range from about −40 to about −45 degrees.

38. The method of claim 35, wherein said first angle has a range from about −25 degrees to about −55 degrees, wherein said second angle has a range from about 25 to about 55 degrees.

39. The method of claim 35, wherein said first angle has a range from about −40 degrees to about −45 degrees, wherein said second angle has a range from about 40 to about 45 degrees.

40. The method of claim 35 further comprising, prior to aligning, fabricating said external pressure side plate and said internal pressure side plate by a process selected from a group consisting of investment casting, diffusion bonding, electron beam deposition, and any combination thereof.

41. The method of claim 35, wherein aligning comprises providing an investment casting mold which comprises said pressure flow redirection areas, said external pressure ribs, and said internal pressure ribs; and pouring a blade material so as to form an investment casting;

wherein said investment casting comprises said external pressure side plate, said internal pressure side plate, said external pressure ribs, and said internal pressure ribs.

42. The method of claim 35, wherein aligning comprises joining said external pressure side plate and said internal pressure side plate.

43. The method of claim 35, wherein said pressure side double wall is disposed from about a blade root to about a blade cover of said turbine blade.

44. The method of claim 35 further comprising:

disposing at least a portion of at least one of said external pressure side plate, said internal pressure side plate, said external pressure ribs, and said internal pressure ribs that is configured to contact a coolant with a plurality of concavities thereon.

45. The method of claim 35 further comprising:

inserting a pressure side dividing rib from said external pressure side plate to said internal pressure side plate;

wherein said pressure side dividing rib divides said pressure side double wall into a leading pressure edge section and a trailing pressure edge cooling section.

46. The method of claim 45 further comprising:

spacing said external pressure ribs and said internal pressure ribs in a first rib spacing for said leading pressure edge section; and spacing said external pressure ribs and said internal pressure ribs in a second rib spacing for said trailing edge cooling section;

wherein said first rib spacing and said second rib spacing are configured to control a first portion of a coolant in said leading pressure edge section and a second portion of said coolant said trailing pressure edge section, respectively.

47. The method of claim 46, wherein said leading pressure edge section is aligned to an at least one airfoil leading edge cooling ejection;

wherein said trailing pressure edge section is aligned to an at least one airfoil trailing edge cooling ejection.

48. A method of fabricating a suction side double wall for a turbine blade comprising:

aligning an external suction side plate, said external suction side plate comprising a plurality of external suction ribs disposed at a first angle with respect to a blade span reference line, and an internal suction side plate comprising a plurality of internal suction ribs disposed at a second angle with respect to said blade span reference line, to form a plurality of suction flow redirection areas between said external suction side plate and said internal suction side plate.

49. The method of claim 48, wherein said first angle has a range from about 25 degrees to about 55 degrees, wherein said second angle has a range from about −25 to about −55 degrees.

50. The method of claim 48, wherein said first angle has a range from about 40 degrees to about 45 degrees, wherein said second angle has a range from about −40 to about −45 degrees.

51. The method of claim 48, wherein said first angle has a range from about −25 degrees to about −55 degrees, wherein said second angle has a range from about 25 to about 55 degrees.

52. The method of claim 48, wherein said first angle has a range from about −40 degrees to about −45 degrees, wherein said second angle has a range from about 40 to about 45 degrees.

53. The method of claim 48, further comprising, prior to aligning, fabricating said external suction side plate and said internal suction side plate by a process selected from a group consisting of investment casting, diffusion bonding, electron beam deposition, and any combination thereof.

54. The method of claim 48, wherein aligning comprises providing an investment casting mold which comprises said suction flow redirection areas, said external suction ribs, and said internal suction ribs; and pouring a blade material so as to form an investment casting;

wherein said investment casting comprises said external suction side plate, said internal suction side plate, said external suction ribs, and said internal suction ribs.

55. The method of claim 48, wherein aligning comprises joining said external suction side plate and said internal suction side plate.

56. The method of claim 48, wherein said suction side double wall is disposed from about a blade root to about a blade cover of said turbine blade.

57. The method of claim 48 further comprising:

disposing at least a portion of at least one of said external suction side plate, said internal suction side plate, said external suction ribs, and said internal suction ribs that is configured to contact a coolant with a plurality of concavities thereon.

58. The method of claim 48 further comprising:

inserting a suction side dividing rib from said external suction side plate to said internal suction side plate;

wherein said suction side dividing rib divides said suction side double wall into a leading suction edge section and a trailing suction edge cooling section.

59. The method of claim 58 further comprising:
spacing said external suction ribs and said internal suction ribs in a third rib spacing for said leading suction edge section; and
spacing said external suction ribs and said internal suction ribs in a forth rib spacing for said trailing suction edge section;
wherein said third rib spacing and said fourth rib spacing are configured to control a third portion of a coolant in said leading suction edge section and a fourth portion of said coolant in said trailing suction edge section, respectively.

60. The method of claim 59, wherein said leading suction edge section is aligned to an at least one airfoil leading edge cooling ejection;
wherein said trailing suction edge section is aligned to an at least one airfoil trailing edge cooling ejection.

61. A method of fabricating a pressure side double wall and a suction side double wall for a turbine blade comprising:
constructing a pressure lattice structure comprising a plurality of external pressure ribs, a plurality of internal pressure ribs, and a plurality of pressure flow redirection areas, wherein said external pressure ribs are disposed at a first angle with respect to a blade span reference line and said internal pressure ribs are disposed at a second angle with respect to said blade span reference line so as to form said plurality of pressure flow redirection areas, wherein said external pressure side plate is aligned over said internal pressure side plate;
constructing a suction lattice structure comprising a plurality of external suction ribs, a plurality of internal suction ribs, and a plurality of suction flow redirection areas, wherein said external suction ribs are disposed at a first angle with respect to said blade span reference line and said internal suction ribs are disposed at a second angle with respect to said blade span reference line so as to form said plurality of suction flow redirection areas, wherein said external pressure side plate is aligned over said internal pressure side plate;
processing said pressure lattice structure so as to form said pressure side double wall, wherein said pressure side double wall comprises a external pressure side plate comprising said external pressure ribs and an internal pressure side plate comprising said internal pressure side ribs; and
processing said suction lattice structure so as to form said suction side double wall, wherein said suction side double wall comprises a external suction side plate comprising said external suction ribs and an internal suction side plate comprising said internal suction side ribs;
wherein said pressure side double wall is configured so as to pass a portion of a coolant through said pressure side double wall;
wherein said suction side double wall is configured so as to pass said another portion of said coolant through said suction side double wall.

62. The method of claim 61, wherein said first angle has a range from about 25 degrees to about 55 degrees, wherein said second angle has a range from about −25 to about −55 degrees.

63. The method of claim 61, wherein said first angle has a range from about 40 degrees to about 45 degrees, wherein said second angle has a range from about −40 to about −45 degrees.

64. The method of claim 61, wherein said first angle has a range from about −25 degrees to about −55 degrees, wherein said second angle has a range from about 25 to about 55 degrees.

65. The method of claim 61, wherein said first angle has a range from about −40 degrees to about −45 degrees, wherein said second angle has a range from about 40 to about 45 degrees.

66. The method of claim 61, wherein said processing said pressure lattice structure and said processing said suction lattice structure is performed by processes selected from a group consisting of investment casting, diffusion bonding, electron beam, and any combination thereof.

67. The method of claim 61 further comprising:
disposing at least a portion of at least one of said external suction ribs, said internal suction ribs, said external suction side plate, said internal suction side plate, said external pressure ribs, said internal pressure ribs, said external pressure side plate, and said internal pressure side plate that is disposed to contact said coolant with said plurality of concavities thereon.

68. The method of claim 61, further comprising:
inserting a pressure side dividing rib between said external pressure side plate and said internal pressure side plate; and
inserting a suction side dividing rib between said external suction side plate and said internal suction side plate;
wherein said pressure side dividing rib divides said pressure side double wall into a leading pressure edge section and a trailing pressure edge section;
wherein said suction side dividing rib divides said suction side double wall into a leading suction edge section and a trailing suction edge section.

69. The method of claim 68 further comprising:
spacing said external pressure ribs and said internal pressure ribs in a first rib spacing in said leading pressure edge section, wherein said first rib spacing is configured to control a first portion of said coolant in said leading pressure edge section;
spacing said external pressure ribs and said internal pressure ribs in a second rib spacing in said trailing pressure edge section, wherein said second rib spacing is configured to control a second portion of said coolant in said trailing pressure edge section;
spacing said external suction ribs and said internal suction ribs in a third rib spacing in said leading suction edge section, wherein said third rib spacing is configured to control a third portion of said coolant n said leading suction edge section; and
spacing said external suction ribs and said internal suction ribs in a fourth rib spacing in said trailing suction edge sections, wherein said fourth rib spacing is configured to control a fourth portion of said coolant in said trailing suction edge section.

70. The method of claim 69 further comprising:
configuring said leading pressure edge section with at least one airfoil leading edge cooling ejection;
configuring said trailing pressure edge section with at least one airfoil trailing edge cooling ejection;
configuring said leading suction edge section with at least one airfoil leading edge cooling ejection; and
configuring said trailing suction edge section with at least one airfoil trailing edge cooling ejection.

71. The method of claim 70 further comprising:
disposing a leading pressure edge cover to said external pressure side plate and said internal pressure side plate;

disposing a trailing pressure edge cover to said external pressure side plate and said internal pressure side plate;

disposing a leading suction edge cover to said external suction side plate and said internal suction side plate;

disposing a trailing suction edge cover to said external suction side plate and said internal suction side plate;

wherein said external pressure ribs, said internal pressure ribs, said external suction ribs, said internal suction ribs, said external pressure side plate, internal pressure side plate, said external suction side plate, said internal suction side plate, said leading pressure edge cover, said trailing pressure edge cover, said trailing suction edge cover, said leading suction edge cover, said pressure side dividing rib, and said suction side dividing rib are disposed in an investment casting.

* * * * *